US009665626B1

(12) United States Patent
Foster

(10) Patent No.: US 9,665,626 B1
(45) Date of Patent: *May 30, 2017

(54) SORTED MERGE OF STREAMING DATA

(71) Applicant: INTERNATIONAL BUSINESS MACHINES CORPORATION, Armonk, NY (US)

(72) Inventor: Kevin F. Foster, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/285,544

(22) Filed: Oct. 5, 2016

Related U.S. Application Data

(63) Continuation-in-part of application No. 15/013,746, filed on Feb. 2, 2016, now Pat. No. 9,549,014.

(51) Int. Cl.
   *H04L 12/28* (2006.01)
   *H04L 12/26* (2006.01)
   *G06F 17/30* (2006.01)
   *G06F 7/36* (2006.01)

(52) U.S. Cl.
   CPC .......... *G06F 17/30516* (2013.01); *G06F 7/36* (2013.01)

(58) Field of Classification Search
   CPC ......... H04L 2012/5681; H04L 12/5693; H04L 1/1841; H04L 1/1874; H04L 45/50
   See application file for complete search history.

(56) References Cited

U.S. PATENT DOCUMENTS

| 6,240,094 B1 * | 5/2001 | Schneider | H04L 1/0002 370/412 |
| 2005/0100035 A1 * | 5/2005 | Chiou | H04L 12/5693 370/412 |
| 2006/0083226 A1 * | 4/2006 | Cahn | H04L 12/5693 370/389 |
| 2007/0165647 A1 * | 7/2007 | Kenney | H04L 47/525 370/395.4 |
| 2015/0199712 A1 | 7/2015 | Radziwonczyk-Syta et al. | |

OTHER PUBLICATIONS

Sailesh Krishnamurthy, Continuous Analytics Over Discontinuous Streams, SIGMOD '10 Proceedings of the 2010 ACM SIGMOD International Conference on Management of Data, pp. 1081-1092.

* cited by examiner

*Primary Examiner* — Maharishi Khirodhar
(74) *Attorney, Agent, or Firm* — Shimokaji IP

(57) ABSTRACT

A method for sorting and merging data from at least two sources may include providing a multi-state merge of queues from a first input queue and a second input queue to a merged output, responsive to states of the first and second input queues, setting the state of the first input queue; preventing merging of the first input queue with the non-empty second input queue while the state of the first input queue is empty waiting; and merging the first input queue with the non-empty second input queue responsive to the state of the first input queue being active or ignore, or the wait duration time being exceeded, or in response to a startup command.

1 Claim, 3 Drawing Sheets

SORTED MERGE OF STREAMING DATA

This application is a continuation in part of parent application Ser. No. 15/013,746, and claims priority benefit to that application.

BACKGROUND OF THE INVENTION

The present invention generally relates to sorted merging of data. More particularly, the present invention relates to sorted merging of streaming data.

Sorted merging often depends on data being available at the same time the sort is performed. When data arrives continuously and at different times, increased complexity results.

As can be seen, there is a need for a method for a sorted merging of streaming data.

SUMMARY OF THE INVENTION

In one aspect, a computer program product for sorting and merging data from at least two sources, the computer program product comprising a computer readable storage medium having program instructions embodied therewith, the program instructions executable by a computer to cause the computer to: timestamp the data from the at least two sources; enter the timestamped data into at least one of a first input queue, a second input queue, a third input queue, and a fourth input queue; provide a multi-state merge of queues from the first input queue and the second input queue to a merged output, wherein each of the first input queue and the second input queue has a state from a group including empty waiting, active, and ignore, wherein the empty waiting state has a wait duration time; initialize each of the first input queue and the second input queue to active; responsive to detecting an empty first input queue to be merged with a non-empty second input queue and the state of the first input queue is active, set the state of the first input queue to empty waiting with a time out; responsive to receiving an entry describing the state of the first input queue when the state of the first input queue is empty waiting, and prior to the time out, set the state of the first input queue to active; responsive to detecting the time out and state of the first input queue equal to empty waiting, set the state of the first input queue to ignore; prevent merging of the first input queue with the non-empty second input queue while the state of the first input queue is empty waiting; merge the first input queue with the non-empty second input queue responsive to the state of the first input queue being active; merge the first input queue with the non-empty second input queue responsive to the state of the first input queue being ignore; merge the first input queue with the non-empty second input queue responsive to the wait duration time being exceeded; and merge the first input queue with the non-empty second input queue responsive to a startup command; begin a sorting of data combined from the first input queue, the second input queue, the third input queue, and the fourth input queue, wherein the sorting of the data combined from the first input queue, the second input queue, the third input queue, and the fourth input queue is executed after casting the combined data to a common data type; receive a notice that the fourth input queue is newly empty; pause the sorting of the combined data until after a waiting period for the newly empty fourth input queue has passed; determine whether to sort the first input queue together with the second input queue or the third input queue based on first input queue timestamp data, second input queue timestamp data, and third input queue timestamp data; responsive to a timestamp of datum from at least one of the first input queue, the second input queue, the third input queue, and the fourth input queue being dated after the beginning of the sorting of the combined data, remove the respective datum to an output queue, restart and complete the sorting of the combined data of the first input queue, the second input queue, and the third input queue based on the determining of whether to sort the first input queue together with the second input queue or the third input queue, wherein the restarting of the sorting proceeds without the removed datum, and wherein the multi-stage merge is for a streaming application.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a method for performing a sorted merge for streaming data.

Figure 1:
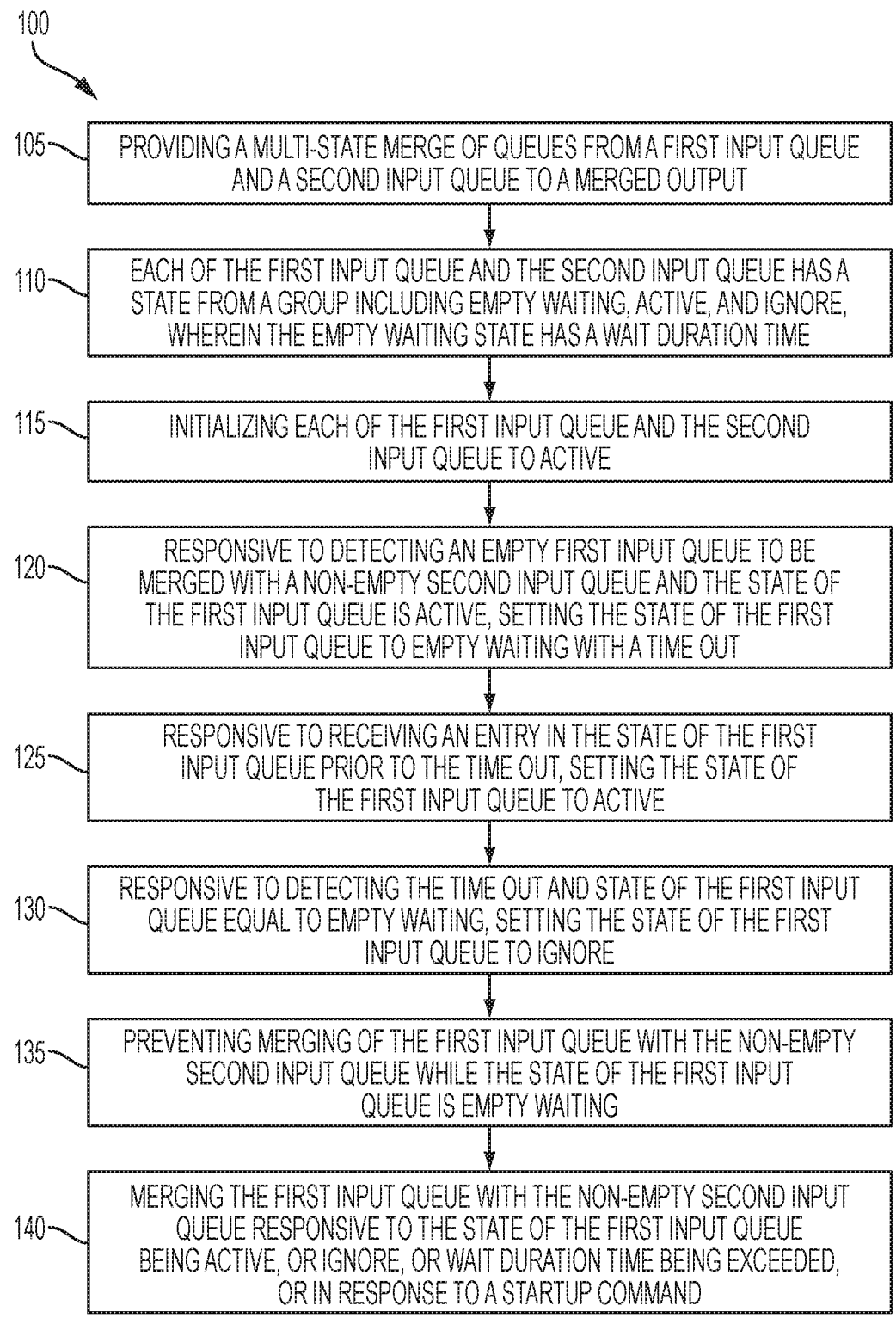
FIG. 1 illustrates a method of performing a sorted merge for streaming data.

In FIG. 1, a method 100 of performing a sorted merge may include a step 105 of providing a multi-state merge of queues from a first input queue and a second input queue to a merged output. A step 110 may include each of the first input queue and the second input queue having a state from a group including waiting, active, and ignore, wherein the empty waiting state has a wait duration time. A step 115 may include initializing each of the first input queue and the second input queue to active. A step 120 may include responsive to detecting an empty first input queue to be merged with a non-empty second input queue and the state of the first input queue is active, setting the state of the first input queue to empty waiting with a time out. A step 125 may include responsive to receiving an entry in the state of the first input queue prior to the time out, setting the state of the first input queue to active. A step 130 may include responsive to detecting the time out and state of the first input queue equal to empty waiting, setting the state of the first input queue to ignore. A step 135 may include preventing merging of the first input queue with the non-empty second input queue while the state of the first input queue is empty waiting. A step 140 may include merging the first input queue with the non-empty second input queue responsive to the state of the first input queue being active, or ignore, or wait duration time being exceeded, or in response to a startup command.

Figure 2:
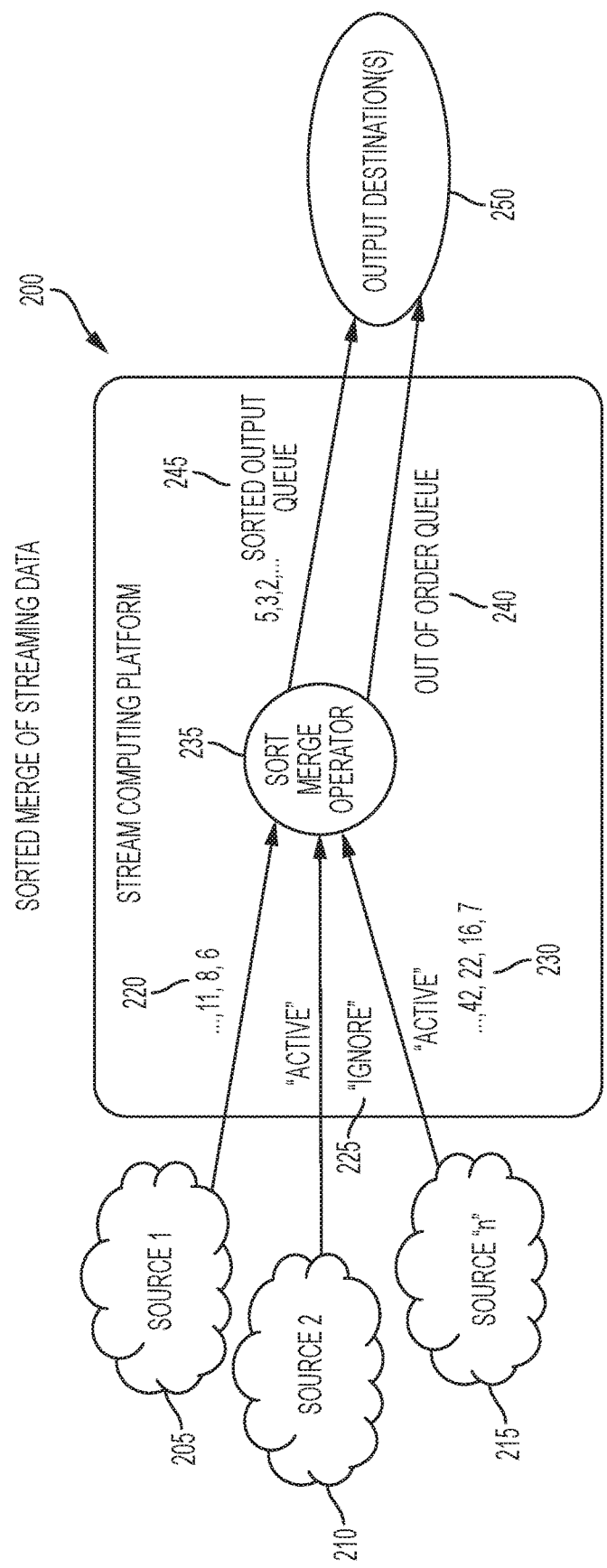
FIG. 2 illustrates a high level architecture of a system performing the method of FIG. 1, before sorting.

In FIG. 2, a high level architecture of a system 200 performing the method 100 is shown before sorting. Two active input queues (205, 215) hold data to be sorted (220,230), and one "ignore" input queue (210) is shown with input 225 to be ignored. The data to be sorted (220, 230) is sorted by the sort merge operator 235, resulting in a sequence "2, 3, 5", and placed on a sorted output queue 245 and sent to an output destination 250. If an error occurs, the input data (220, 230) is output by the sort merge operator 235 to the out of order queue 240 and sent to the output destination 250.

Figure 3:
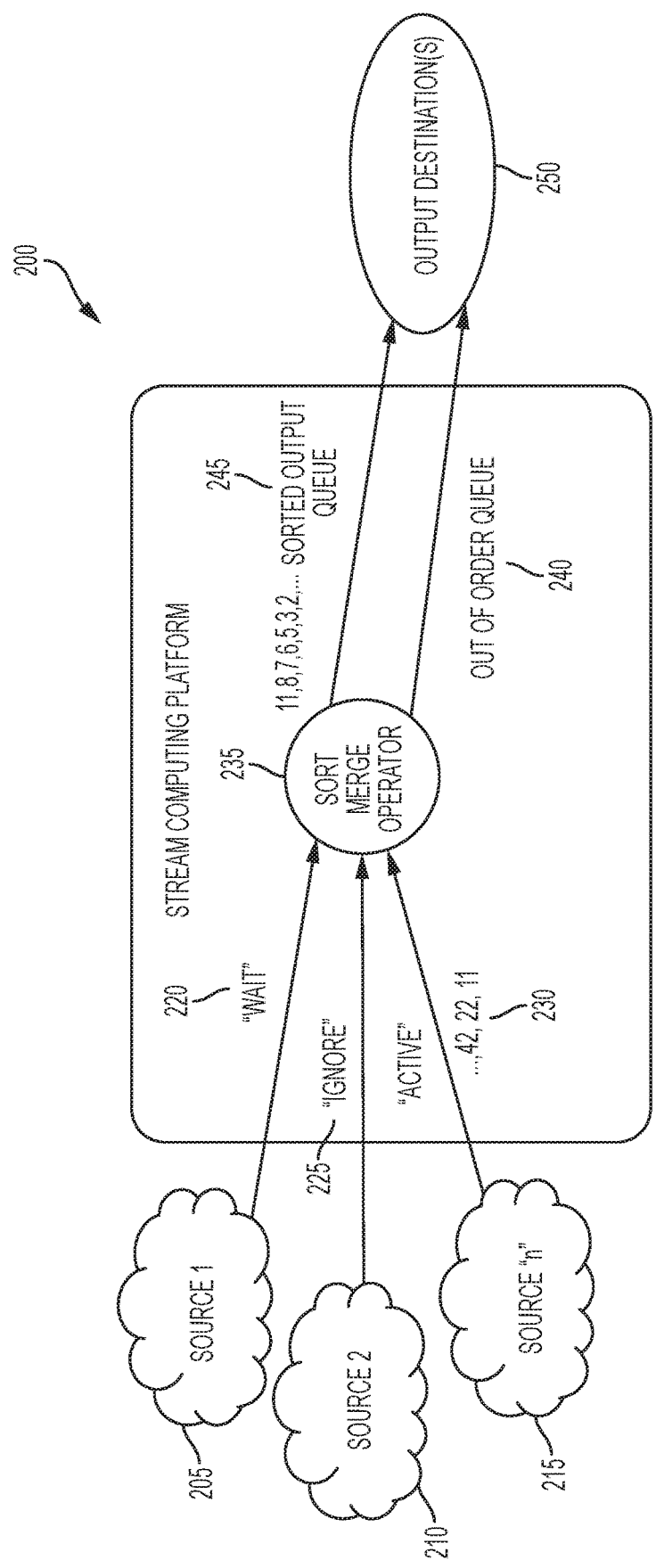
FIG. 3 illustrates the high level architecture of FIG. 2 after sorting.

In FIG. 3, the high level architecture of the system 200 performing the method 100 is shown after sorting. The next data to be sorted may be "6, 7, 8, 11" at which point input queue for source 1 (205) is empty as shown at 220. The sort merge operator 235 pauses with data 230 "16, 22, 42" still to be processed in the input queue 215 for source "n". Source 2 (210) still outputs data 225 that is ignored. Sorted data 245 is output from the sorted merge operator 235 to the output destination 250. As in FIG. 2, if an error occurs, the input data (220, 230) is output by the sort merge operator 235 to the out of order queue 240 and sent to the output destination 250.

In an embodiment, the method 100 includes introducing a waiting period concept to the sort merge algorithm, where data may be sorted across all queues currently possessing data while ignoring empty queues that have been empty longer than a predefined length of time. Any newly empty queues may temporarily pause the sorting until the waiting period on the empty queue is exceeded, at which time the queue may be marked as "ignore" and the remaining queues may be processed as normal by the sort merge algorithm. Queues that are marked as "ignore" can rejoin the sort merge algorithm again when they have data that's relevant to the current sort output, but only the records belonging in the current sorted output may be included in the sorting. Earlier/lessor values that arrive after the sort merge operation has moved beyond that point may be routed to a secondary output queue as "out of order" data.

In an embodiment, the method 100 may include the sort merge operator accepting two or more input queues to be sorted together based on normal numeric, date, timestamp, text, or other user defined sort criteria. All values to be compared for sorting may be off the same data type or must cast to a single common data type. The sort merge operator may have two output queues, "sorted" and "out of order".

In an embodiment, the method 100 may include queues that can have a status of "active", "wait", or "ignore". For active status, a queue may be considered for sort merge algorithm. For wait status, a queue may be waiting on input and blocks any sort merge processing. For ignore status, a queue may have been empty beyond its wait duration and may not block sort merge processing.

In an embodiment, the method 100 may include that on startup, if an input queue has data then its status may be set to "active". Otherwise the status may be set to "wait" and the queue's wait duration counter may be started. Sort merge processing may occur on one of three events: 1. On startup 2. When data arrives in a "wait" or "ignore" status input queue 3. When the wait time duration is exceeded for a "wait" status input queue. For any of these events, whenever any "active" queue becomes empty during sort merge processing then that queue status may change from "active" to "wait", its wait duration timer may be started, and all sort merge processing may be stopped.

In an embodiment, the method 100 may include the following processing on startup: if an input queue has data then its status may be set to "active". Otherwise the status may be set to "wait" and the wait duration counter may be started. Initial sort merge processing may be performed if all input queues are in the "active" state.

In an embodiment, the method 100 may include the following processing on arrival of data in a "wait" or "ignore" status input queue: when data arrives in a "wait" status queue then the status may be changed to "active" and the wait time counter may be cleared. If no queues are in the "wait" state then sort merge processing may be started. When data arrives in an "ignore" status queue then the input data may be compared to a last value sent on the "sorted data" output queue. If the input data value is greater or equal to the last output value then the queue state may be changed to "active" and sort merge processing may be started if there are no remaining queues in the "wait" state.

If the input data is less than the last output value then the input data may be sent on the "out of order" output queue and the queue may remain in the "ignore" state.

In an embodiment, the method 100 may include the following processing when wait time duration is exceeded on a queue: when the wait time duration is exceeded on an empty queue in "wait" status then the queue status may be changed to "ignore", and sort merge processing may be started if there are no other queues in the "wait" state. Sorting may occur across all input queues marked as "active" when there are no queues in the "wait" state. Sorting may continue across the active input queues until one queue becomes empty, at which time that queue may enter the "wait" state, the queue's wait timer may be started, and sorting may pause. An input queue can cycle between "active", "wait", and "ignore" states repeatedly. Each input queue may have a "wait duration" time value that may specify how long it should remain in the "wait" state when it has no data. All input queues can share the same wait duration time value, or this can be defined on an individual queue basis. At application shutdown, either all remaining queue data can be sorted without regard to queue status and output on the "sorted" output queue, or if otherwise specified, all remaining queue data can be sent on the "out of order" output queue.

In an embodiment, the method 100 may have the following example processing sequence which may show a three input queue application and how the data is processed through the new sort merge operator.

Sequence of steps:
T1: On startup, two of the queues may have data while the third is empty. As there may be at least one queue in the "wait" state, no processing occurs:
Q1: 2, 3, 5, 6, 8, 11 "active
Q2: empty "wait"
Q3: 7, 16, 22, 42 "active"
Sorted output: empty
Out of order output: empty T2: Once the wait time on Q2 is exceeded, then the status on Q2 may change to "ignore" and the data in the "active" queues may be processed until one or more become empty and enter the "wait" state:
Q1: empty "wait"
Q2: empty "ignore"
Q3: 16, 22, 42 "active"
Sorted output: 2, 3, 5, 6, 8, 11
Out of order output: empty T3: Q2 may receive two values of "4" and "12". The value of "4" may be emitted on the out of order queue as it may be less than the most recent value submitted on the sorted output queue i.e. "11". The status of Q2 may change to "active" as it now may have data that can be sorted:
Q1: empty "wait"
Q2: 12 "active"
Q3: 16, 22, 42 "active"
Sorted output: 2,3,5,6,8,11
Out of order output: 4

T4: Once the wait time on Q1 is exceeded, then the status on Q1 may change to "ignore" and the data in the "active" queues may be processed until one or more become empty and enter the "wait" state:
Q1: empty "ignore"
Q2: empty "wait"
Q3: 16, 22, 42 "active"
Sorted output: 2, 3, 5, 6, 8, 11, 12
Out of order output: 4

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for sorting and merging data from at least two sources, the computer program product comprising a non-transitory computer readable storage medium having program instructions embodied therewith, the program instructions executable by a computer to cause the computer to:

timestamp the data from the at least two sources;
   enter the timestamped data into at least one of a first input queue, a second input queue, a third input queue, and a fourth input queue;
   provide a multi-state merge of queues from the first input queue and the second input queue to a merged output, wherein
   each of the first input queue and the second input queue has a state from a group including empty waiting, active, and ignore, wherein the empty waiting state has a wait duration time;
   initialize each of the first input queue and the second input queue to active;
   responsive to detecting an empty first input queue to be merged with a non-empty second input queue and the state of the first input queue is active, set the state of the first input queue to empty waiting with a time out;
   responsive to receiving an entry describing the state of the first input queue when the state of the first input queue is empty waiting, and prior to the time out, set the state of the first input queue to active;
   responsive to detecting the time out and state of the first input queue equal to empty waiting, set the state of the first input queue to ignore;
   prevent merging of the first input queue with the non-empty second input queue while the state of the first input queue is empty waiting;
   merge the first input queue with the non-empty second input queue responsive to the state of the first input queue being active;
   merge the first input queue with the non-empty second input queue responsive to the state of the first input queue being ignore;
   merge the first input queue with the non-empty second input queue responsive to the wait duration time being exceeded; and
   merge the first input queue with the non-empty second input queue responsive to a startup command;
   begin a sorting of data combined from the first input queue, the second input queue, the third input queue, and the fourth input queue,
   wherein the sorting of the data combined from the first input queue, the second input queue, the third input queue, and the fourth input queue is executed after casting the combined data to a common data type;
   receive a notice that the fourth input queue is newly empty;
   pause the sorting of the combined data until after a waiting period for the newly empty fourth input queue has passed;
   determine whether to sort the first input queue together with the second input queue or the third input queue based on first input queue timestamp data, second input queue timestamp data, and third input queue timestamp data;
   responsive to a timestamp of datum from at least one of the first input queue, the second input queue, the third input queue, and the fourth input queue being dated after the beginning of the sorting of the combined data, remove the respective datum to an output queue,
   restart and complete the sorting of the combined data of the first input queue, the second input queue, and the third input queue based on the determining of whether to sort the first input queue together with the second input queue or the third input queue,
   wherein the restarting of the sorting proceeds without the removed datum, and
   wherein the multi-stage merge is for a streaming application.

* * * * *